United States Patent
Watson

(10) Patent No.: US 8,393,294 B2
(45) Date of Patent: Mar. 12, 2013

(54) LIVE BACTERIA LIQUID PRODUCT APPLICATOR AND REMOTE MANAGEMENT SYSTEM THEREFORE

(76) Inventor: James B. Watson, Pierce, NE (US)

(*) Notice: Subject to any disclaimer, the term of this patent is extended or adjusted under 35 U.S.C. 154(b) by 457 days.

(21) Appl. No.: 12/313,997

(22) Filed: Nov. 26, 2008

(65) Prior Publication Data

US 2009/0087896 A1 Apr. 2, 2009

Related U.S. Application Data

(63) Continuation-in-part of application No. 10/858,762, filed on Jun. 2, 2004, now Pat. No. 7,741,109.

(51) Int. Cl.
 *B05C 11/00* (2006.01)
 *B05B 7/00* (2006.01)
 *B05D 5/00* (2006.01)

(52) U.S. Cl. .......... 118/688; 118/300; 427/421.1

(58) Field of Classification Search ............ 118/679
 See application file for complete search history.

(56) References Cited

U.S. PATENT DOCUMENTS

| | | | |
|---|---|---|---|
| 4,054,784 A * | 10/1977 | Ricciardi et al. ............ 700/240 |
| 4,161,397 A | 7/1979 | Bellet et al. |
| 4,449,968 A | 5/1984 | Peterson |
| 4,850,997 A * | 7/1989 | DuBose ..................... 604/289 |
| 5,857,589 A * | 1/1999 | Cline et al. .................. 222/1 |
| 6,713,073 B1 | 3/2004 | Aehle |
| 6,867,645 B1 * | 3/2005 | Ansari et al. ................ 327/588 |
| 2001/0029887 A1 * | 10/2001 | Falck et al. ................. 118/694 |
| 2003/0133808 A1 * | 7/2003 | Sabini et al. ............... 417/53 |
| 2004/0104244 A1 * | 6/2004 | Cline et al. ................. 222/63 |
| 2004/0120804 A1 * | 6/2004 | Sabini et al. .............. 415/118 |
| 2005/0010321 A1 * | 1/2005 | Contos et al. ............. 700/123 |
| 2006/0035470 A1 * | 2/2006 | Horii et al. ................ 438/758 |

* cited by examiner

Primary Examiner — Yewebdar Tadesse
Assistant Examiner — Charles Capozzi
(74) Attorney, Agent, or Firm — Denis L. Thomte; Thomte Patent Law Office LLC

(57) ABSTRACT

An applicator machine for applying a liquid carrier having live bacteria suspended therein, which are in a dormant state, to a target host comprising a pump having inlet and discharge sides, with the inlet side of the pump being in fluid communication with the liquid carrier. A first fluid conduit extends from the discharge side of the pump to an air induction nozzle which is in communication with a source of air under pressure. A flow control is imposed in the first conduit for adjusting the amount of liquid carrier passing therethrough. The pump and the air supply for the air induction nozzle are operatively connected to a power supply. The pump, when activated, causes the liquid carrier to be pumped to the air induction nozzle wherein the liquid carrier is mixed with air to create small droplets thereof for spraying onto the target host. A remote management system for the machine(s) is also provided.

9 Claims, 2 Drawing Sheets

LIVE BACTERIA LIQUID PRODUCT APPLICATOR AND REMOTE MANAGEMENT SYSTEM THEREFORE

CROSS REFERENCE TO RELATED APPLICATION

This is a continuation-in-part application of the application entitled LIVE BACTERIA PRODUCT APPLICATOR, Ser. No. 10/858,762, filed Jun. 2, 2004 now U.S. Pat. No. 7,741,109.

BACKGROUND OF THE INVENTION

1. Field of the Invention

This invention relates to a live bacteria liquid product applicator and more particularly to an applicator for applying a live bacteria product to a target host wherein live bacteria, that are in a dormant state, are suspended in a clear liquid fluid carrier. This invention also relates to a remote management system for one or more of the product applicators.

2. Description of the Related Art

Live bacteria formulations are frequently applied to forage products or feed to enhance the forage product or feed. The prior art products fall generally into two categories which are either a dry soluble powder form or a dry granular non-soluble form. The dry granular products are directly applied to a forage through a metering device such as a Gandy box, usually at a rate of 4 to 16 ounces per ton of forage treated. The dry soluble products must first be hydrated with water, then applied to the forage within a 48-hour period post-hydration through a liquid pump system at the rate of 4 ounces to 1 gallon per ton of forage.

The dry granular products of the prior art, even if packaged in either paper bags or plastic pails, will sometimes come into direct contact with ambient air during manufacturing and processing or upon simply opening the product lid with the ambient air containing moisture or humidity. The moisture or humidity will activate the dormant bacteria upon contact, which in turn causes the bacteria to inadvertently live and die before it can be applied to its target host. If so, the value of the product will then be a total loss. Limestone carriers of the prior art products also carry minute traces of moisture, and such moisture severely reduces the product's ability to sustain an adequate shelf life. If the prior art product is a soluble powder product, it will also need to be hydrated before application. The hydration immediately activates all of the dormant bacteria and the producer has to apply the entire mixture within a 48-hour time frame or before since the bacteria will naturally deplete its food source and die, creating a total loss of the product value.

Further, the prior art products on the market today must be either removed from their original shipping container and/or physically poured into a dry applicator prior to application, or they must be contaminated with water, reducing their shelf life to less than 48 hours, post-contamination. Additionally, the prior art dry granular products have a tendency of sorting during shipment. This shakes any fines to the bottom of the shipping container or applicator leaving the either larger or lighter material to work its way to the top. Since the bacteria attach themselves to these particles, they may also migrate with these particles. This situation usually also causes the product in an applicator to compact. Product compaction also causes applicator failure due to the lack of product flow. The prior art dry granular products also require a significant percentage of the product to be applied to the target host to increase its ability of uniform coverage. As the volumes or rates decrease to meet the product's needs, so does the product's ability of achieving a uniform coverage. Prior art rates are from $1/10^{th}$ of a pound to one-pound application rates. Other dry soluble powder products may settle to the bottom of the applicator tank upon hydration. This will depend greatly on the product's rate of dilution. As application rates decrease to meet the producer's ongoing needs of hauling less product to the field, the manufacturers must in turn make their products more condensed to meet the active ingredient needs. Such limits the solubility of the product.

Dry soluble powders mixed with water carriers have attempted to achieve low inclusion rates for some time. However, such products result in droplets which are very large in their molecular size and weight resulting in that there are actually few droplets being delivered per one ton of forage treated so uniform coverage is poor.

The applicators of the prior art suffer from many disadvantages. To the best of applicant's knowledge, the prior art applicators today are not able to apply a live bacteria product, such as described in applicant's co-pending application entitled "LIVE BACTERIA PRODUCT," Ser. No. 10/853,346, filed May 25, 2004, to the target host which may be forage, feed, livestock, etc. One of the prior art applicators, after product rehydration, simply drips the active solution onto the forage. This applicator needs periodic cleaning and produces droplets that are very large in their molecular size and weight which means that there are actually very few droplets being delivered per one ton of forage, creating non-uniform coverage patterns. In another prior art applicator, after rehydrated product is pumped and sprayed through the applicator nozzles as product densities increase, product solubility decreases, causing settling of active ingredients. These applicators also require frequent cleaning of the same.

In applicant's parent application, Ser. No. 10/858,762 filed Jun. 2, 2004, the liquid product to be applied was pumped to the product applicator by a peristaltic pump. Applicant has discovered that a progressive cavity pump more precisely pumps the liquid product to the product applicator.

SUMMARY OF THE INVENTION

An applicator is provided for applying a liquid carrier having live bacteria suspended therein, which are in a dormant state, to a target host such as forage, feed, livestock, etc. The applicator apparatus comprises a progressive cavity pump having a positive linear fluid displacement throughout a wide range of pump RPMs and product viscosities, with inlet and discharge sides, with the inlet side of the pump being in fluid communication with the liquid carrier. A continuous fluid conduit extends from the product supply to the discharge side of the air injection nozzle means which is in communication with a source of air under pressure. A flow control means such as a flow meter is imposed in the first fluid conduit to permit the selective metering of the liquid carrier. A power supply is connected to the pump for selectively activating the pump. The pump, when activated, causes the liquid carrier to be pumped to the air induction nozzle means wherein the liquid carrier is mixed with air to create small droplets thereof for spraying onto the target host. The liquid carrier is contained in a plastic bag, pail or drum. The applicator apparatus may be either stationary or a mobile installation such as a chopper or harvester. If used on a chopper, an optional motion sensor or the like is provided which senses the absence of target host or in this case, forage being passed through the chopper and having the liquid carrier sprayed thereon and then deactivates the pump.

Applicant has also devised a remote management system which permits an operator to review application history, monitor present status and adjust applicator settings as needed to ensure that the proper amount of liquid product is being sprayed onto the target host. The remote management system also permits the operator to remotely calibrate and/or vary the amount of liquid product which is to be sprayed onto the target host.

It is therefore a principal object of the invention to provide an improved applicator machine for applying a liquid carrier having live bacteria suspended therein, which are in a dormant state, to a target host such as forage, feed, livestock, etc.

A further object of the invention is to provide an applicator of the type described which forces air through the liquid carrier to create small droplets thereof for spraying onto the target host.

Still another object of the invention is to provide an applicator of the type described which requires little, if any, cleaning.

Still another object of the invention is to provide an applicator of the type described which may be mounted on a chopper, harvester or stationary feed mill applications, etc.

Yet another object of the invention is to provide an applicator machine that limits and protects the product from inadvertent product contamination right up to the point of actual product application onto its target host. The product only comes into physical contact with the fluid carrier, packaging vessel, progressive cavity pump, hose and nozzle.

Still another object of the invention is to provide an applicator machine that is capable of applying very small amounts of product with maximum coverage with application rates of 1 to 37 grams of actual product delivered directly to its target host.

Still another object of the invention is to provide a remote management system which permits an operator to review the operation of the applicator machine or machines to ensure that the proper amount of liquid product is being sprayed onto the target host.

Yet another object of the invention is to provide a remote management system which also permits the operator to remotely calibrate and/or vary the amount of liquid product which is to be sprayed onto the target host.

These and other objects will be apparent to those skilled in the art.

DETAILED DESCRIPTION OF THE INVENTION

Figure 1:
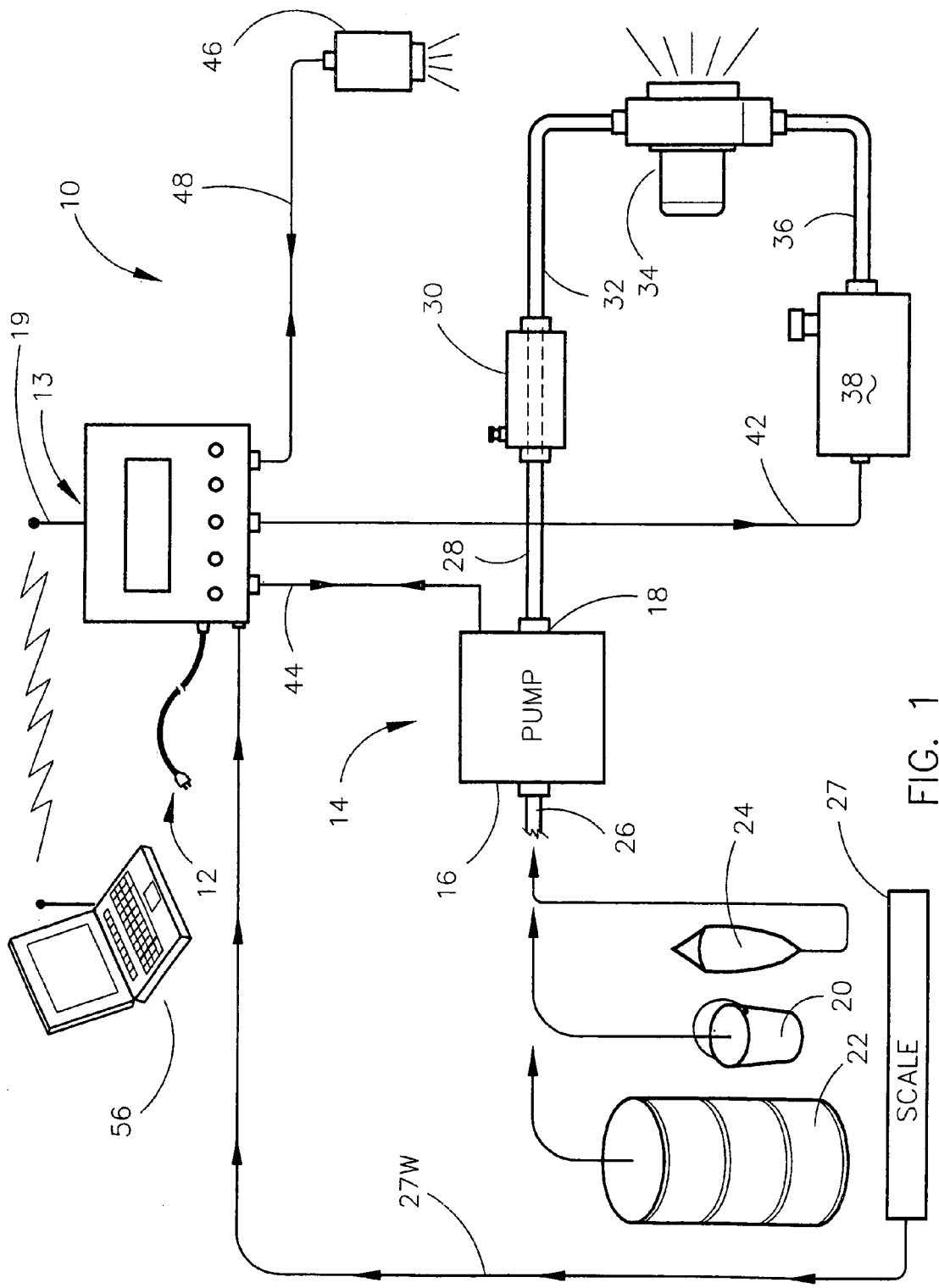
FIG. 1 is a schematic of the applicator machine of this invention.

Referring to FIG. 1, the numeral 10 refers generally to the applicator apparatus or machine of this invention. The numeral 12 refers generally to a power supply which may be 9V, 12V, 24V or 115V. Power supply 12 is electrically connected to a control panel 13 which is electrically connected to a pump 14 which is preferably a progressive cavity pump of conventional design having an inlet side 16 and a discharge side 18. Control panel 13 includes an antenna 19. The inlet side 16 of pump 14 is in fluid communication with a source of live bacteria product contained in a five-gallon pail 20, a 50-gallon drum 22 or a polyurethane bag 24 by means of conduit, hose or tube 26. The numeral 27 refers to an electronic scale of conventional design upon which the pail 20, drum 22 or bag 24 is placed. Scale 27 is electrically connected to the control panel 13 by wire(s) 27W. The live bacteria product within the pail 20, drum 22 or bag 24 is of the type described in the co-pending application of applicant entitled "LIVE BACTERIA PRODUCT" filed May 25, 2004, Ser. No. 10/853,346. The live bacteria product is comprised of mineral oil and polymers and is substantially moisture-free and which has the live bacteria, in a dormant state, suspended therein. If required, the liquid product may also have an adsorbent added thereto. The bacteria within the liquid product remain dormant until they come into contact with moisture from the target host.

Conduit, hose or tube 28 extends from the discharge side 18 of pump 14 to a selectively adjustable flow control means such as a flow meter 30 to permit the selective control and/or monitor of the amount of liquid product passing therethrough. Hose, conduit or tube 32 connects the flow control means 30 to an air induction nozzle means 34. Air induction nozzle means 34 has an air line 36 extending therefrom which is in communication with a source of air under pressure such as an air pump or an in-house supply hookup generally referred to by the reference numeral 38. If the applicator apparatus of this invention may be mounted on a forage chopper or forage harvester, the air supply to the air induction nozzle means 34 may be the on-board air compressor on the implement. The air supply 38 is electrically connected to the control panel 13 by wire(s) 42. The control panel 13 is also connected to the pump 14 by wire(s) 44.

If the applicator machine of this invention is mounted on a forage chopper or forage harvester, it is preferred that a motion sensor 46 be provided which is electrically connected to the panel 13 by wire(s) 48. The motion sensor 46 will sense the presence of material passing adjacent the air induction nozzle means 34 and when the motion sensor 46 detects an absence of such material passing by the air induction nozzle means 34, the sensor 46 will deactivate the pump 14 to interrupt the supply of liquid product being supplied to the air induction nozzle means 34. Motion sensor 46 is of conventional design and may be of the infrared type, etc.

In use, the hose 26 is connected to the interior of the pail 20, drum 22 or bag 24 so that the liquid live bacteria product is supplied to the pump 14 which pumps the product through the flow monitor 30 to the air induction nozzle means 34. The air induction nozzle means 34 causes the liquid product to be broken up into very small droplets which are sprayed onto the target host. The moisture and pH associated with the target host will then activate the live bacteria.

There are many advantages to the applicator apparatus of this invention. The applicator of this invention does not require a reservoir since the product to be applied through the applicator is in a ready-to-use form and is provided in pail form, drum form or bag form. The applicator of this invention does not require any hydrating or mixing prior to use since the liquid product supplied thereto is in a stable homogenous, ready-to-use state. The applicator uses the assistance of the air induction nozzle means 34 with the addition of auxiliary air reducting the otherwise very large product droplets to thousands of very small droplets thereby providing maximum product coverage, with a micro-application rate. As stated, the products that are to be used in the applicator of this invention are all live dormant stable bacteria. Since the product is not activated in a reservoir, line, pump or nozzle, periodic cleaning of the applicator is virtually eliminated.

Figure 2:
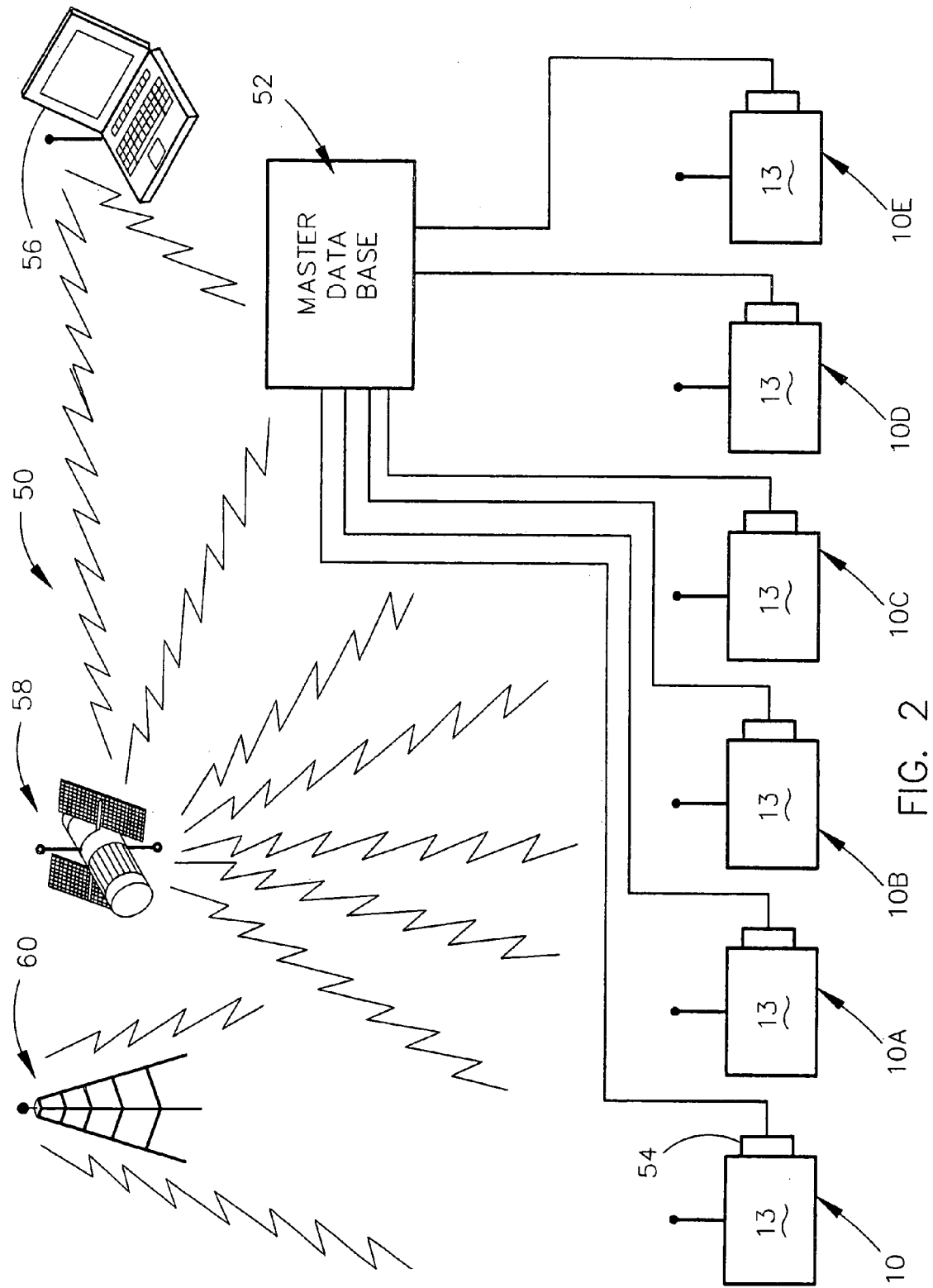
FIG. 2 is a schematic of the remote management system of this invention.

In FIG. 2, a remote management system 50 is depicted in schematic form. System 50 includes a master database which is in communication with one or more of the applicator machines 10, 10A, 10B, 10C, 10D and 10E, which will be located in various geographic locations, by any convenient means such as by way of the modems 54 connected to the control panels 13 of the applicator machines. In FIG. 2, a laptop computer 56 is shown to be in radio communication with the master database 52. If the computer 56 is located adjacent the master database 52, computer 56 may be hard wired to the master database. The computer 56 may also be in radio communication with the control panel 13 as seen in FIG. 1. Computer 56 is also in communication with a satellite. FIG. 2 also illustrates a cellular tower 60 which may be employed to enable the master database 52 and computer 56 to communicate with the control panel(s) 13.

The scale 27 permits an operator to automatically periodically check the calibration of the machine 10 by comparing the amount of liquid product, by weight, which has been discharged from the machine 10 onto the target host, with the amount of liquid product which should have been discharged.

The system 50 permits an off-site operator to view the operation of the machine 10 on a day-by-day basis. It also allows the off-site operator full programming accessibility. Each machine is tied into the master database 52 so that each machine 10 may download its daily records to the master database. This information is then used for automatic restocking, billing and full machine status information.

In summary and to further explain the operation of the preferred remote management system of this invention, the liquid product applicator or machine 10 is located at a site where the liquid product is to be applied to a target host. The preferred machine 10 includes an electronic scale 27 upon which the liquid product container is placed with the electronic scale being in communication with the control panel 13. The machine 10 includes a progressive cavity pump 16 having its inlet side in fluid communication with the liquid product in the container with the pump 16 being driven by an electric motor. The machine also includes a spray applicator 34 having its inlet side in fluid communication with the discharge side of the pump 16 so that the spray applicator 34 may spray the liquid product onto the target host.

The control panel 13 is associated with the pump 16 and the spray applicator 34 to control the operation of the pump 16 and so that the motor of the pump 16 sends pulse feed back to the control panel 13. The control panel 13 then controls the motor of the pump 16 in terms of speed (RPM) and duration (time running). The scale 27 determines the weight of the product remaining in the product container and transfers that information to the control panel 13. The control panel 13 then compares the pulse feed back from the pump 16 to the weight of the liquid product remaining in inventory. The control panel 13 then determines if the application rate per each pulse is correct. If it is not, the control panel 13 automatically corrects the calibration, which in turn alters the amount of liquid product delivered by each motor pulse.

A computer is located remotely from the machine which is in communication with the control panel 13 to allow an off-site operator to ascertain the operation of the control panel 13.

Thus it can be seen that the invention accomplishes at least all of its stated objectives.

The invention claimed is:

1. A remote management system, comprising:
   a liquid applicator machine for applying a liquid carrier having live bacteria suspended therein, which are in a dormant state, to an animal feed;
   said applicator machine comprising:
   (a) a container having the liquid product contained therein;
   (b) a progressive cavity pump having an inlet side and a discharge side with said inlet side thereof being in fluid communication with the liquid product in said container, said progressive cavity pump being driven by an electric motor so that said pump will discharge a predetermined amount of liquid product per pulse of said motor;
   (c) a control means associated with said electric motor;
   (d) said control means configured to control the speed and duration of said electric motor;
   (e) a spray applicator having an inlet side and a discharge side with said inlet side thereof being in fluid communication with said discharge side of said progressive cavity pump to enable said spray applicator to spray the liquid product onto the animal feed;
   (f) said motor having pulse feedback capability configured to provide pulse feedback data to said control means;
   an electronic scale associated with said container whereby said scale determines the physical weight of the product remaining in said container;
   said scale being operatively connected to said control means so that data relating to the weight of said liquid product remaining in said container is transmitted to said control means with said control means configured to compare the pulse feedback from said motor to the weight of the liquid product remaining in said container to enable said control means to determine if the application rate per pulse is correct and if the application rate per pulse is not correct, to automatically correct calibration which in turn changes the amount of liquid product delivered by each motor pulse;
   said control means configured to periodically determine the weight of unused product in said container;
   and a computer remote from said machine and which is in communication with said control means to allow an off-site operator to ascertain the functioning of the machine and to permit the off-site operator to program the operation of said control means.

2. The remote management system of claim 1 wherein said computer is in communication with said control means by way of a satellite.

3. The system of claim 1 wherein said computer is in communication with said control means via cell phone technology.

4. A remote management system, comprising:
   a liquid applicator machine for applying a liquid carrier having live bacteria suspended therein, which are in dormant state, to an animal;
   said applicator machine comprising:
   (a) a container having the liquid product contained therein;
   (b) a progressive cavity pump having an inlet side and a discharge side with said inlet side thereof being in fluid communication with the liquid product in said container, said progressive cavity pump being driven by an electric motor so that said pump will discharge a predetermined amount of liquid product per pulse of said motor;
   (c) a control means associated with said electric motor;
   d) said control means configured to control the speed and duration of said electric motor;
   (e) a spray applicator having an inlet side and a discharge side with said inlet side thereof being in fluid communication with said discharge side of said progressive cavity pump to enable said spray applicator to spray the liquid product onto the animal;

(f) said motor having pulse feedback capability configured to provide pulse feedback data to said control means;

an electronic scale associated with said container whereby said scale determines the physical weight of the product remaining in said container;

said scale being operatively connected to said control means so that data relating to the weight of said liquid product remaining in said container is transmitted to said control means with said control means configured to compare the pulse feedback from said motor to the weight of the liquid product remaining in said container to enable said control means to determine if the application rate per pulse is correct and if the application rate per pulse is not correct, to automatically correct calibration which in turn changes the amount of liquid product delivered by each motor pulse;

said control means configured to periodically determine the weight of unused product in said container;

and a computer remote from said machine and which is in communication with said control means to allow an off-site operator to ascertain the functioning of the machine and to permit the ft-site operator to program the operation of said control means.

5. The remote management system of claim 4 wherein said computer is in communication with said control means by way of a satellite.

6. The system of claim 4 wherein said computer is in communication with said control means via cell phone technology.

7. A remote management system, comprising:

a liquid applicator machine for applying a liquid carrier having live bacteria suspended therein, which are in dormant state, to forage:

said applicator machine comprising:
(a) a container having the liquid product contained therein;
(b) a progressive cavity pump having an inlet side and a discharge side with said inlet side thereof being in fluid communication with the liquid product in said container, said progressive cavity pump being driven by an electric motor so that said pump will discharge a predetermined amount of liquid product per pulse of said motor;
(c) a control means associated with said electric motor;
(d) said control means configured to control the speed and duration of sac electric motor;
(e) a spray applicator having an inlet side and a discharge side with said inlet side thereof being in fluid communication with said discharge side of said progressive cavity pump to enable said spray applicator to spray the liquid product onto the forage;
(f) said motor having pulse feedback capability configured to provide pulse feedback data to said control means;

an electronic scale associated with said container whereby said scale determines the physical weight of the product remaining in said container;

said scale being operatively connected to said control means so that data relating to the weight of said liquid product remaining in said container is transmitted to said control means with said control means configured to compare the pulse feedback from said motor to the weight of the liquid product remaining in said container to enable said control means to determine if the application rate per pulse is correct and if the application rate per pulse is not correct, to automatically correct calibration which in turn changes the amount of liquid product delivered by each motor pulse;

said control means configured to periodically determine the weight of unused product in said container;

and a computer remote from said machine and which is in communication with said control means to allow an off-site operator to ascertain the functioning of the machine and to permit the off-site operator to program the operation of said control means.

8. The remote management system of claim 7 wherein said computer is in communication with said control means by way of a satellite.

9. The system of claim 7 wherein said computer is in communication with said control means via cell phone technology.

* * * * *